No. 823,483. PATENTED JUNE 12, 1906.
E. T. SHEPARD.
YOKE FOR SPLIT SHEET METAL PULLEYS.
APPLICATION FILED JUNE 16, 1905.
2 SHEETS—SHEET 1.
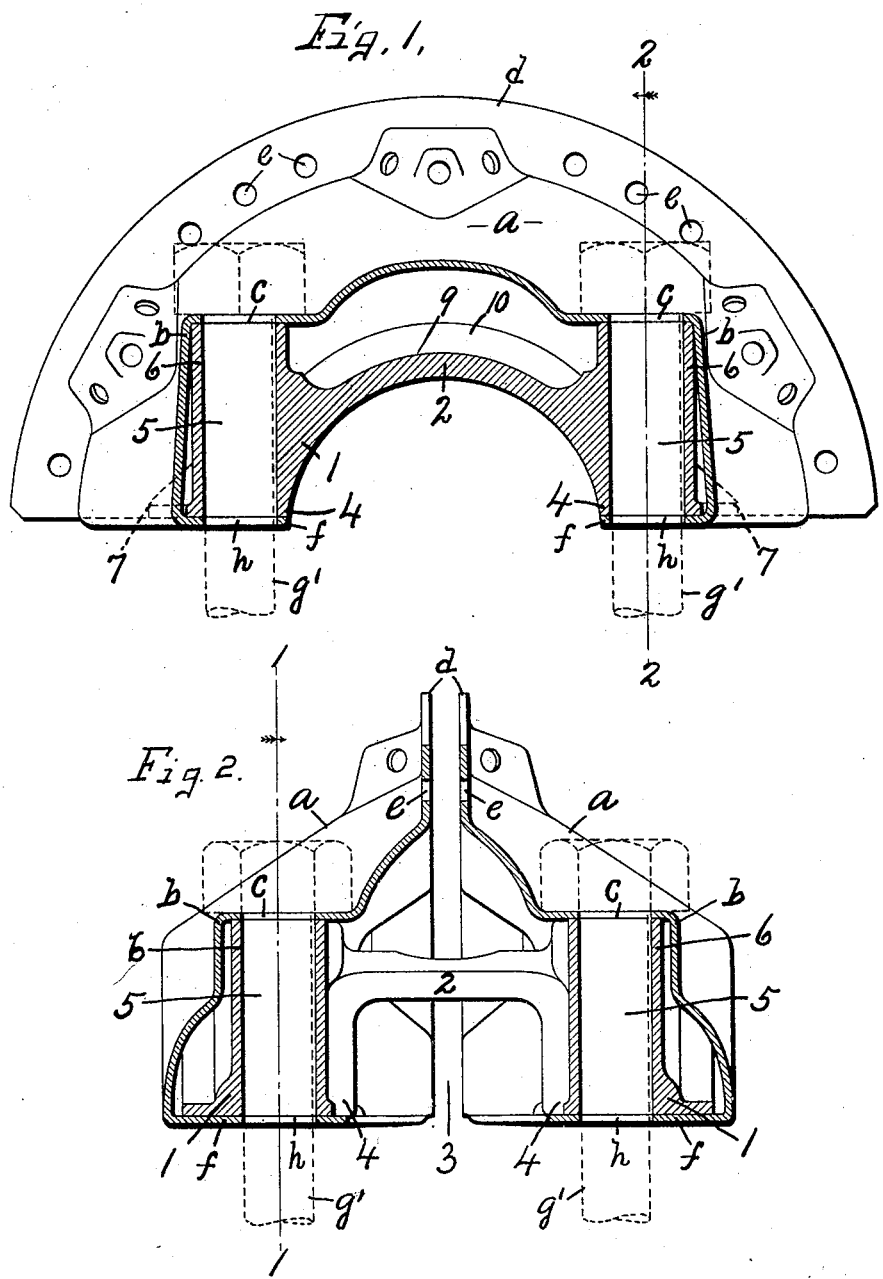
WITNESSES:
B. E. Robinson
H. C. Chase
INVENTOR:
Edgar T. Shepard
BY
Howard P. Dawson
ATTORNEY.

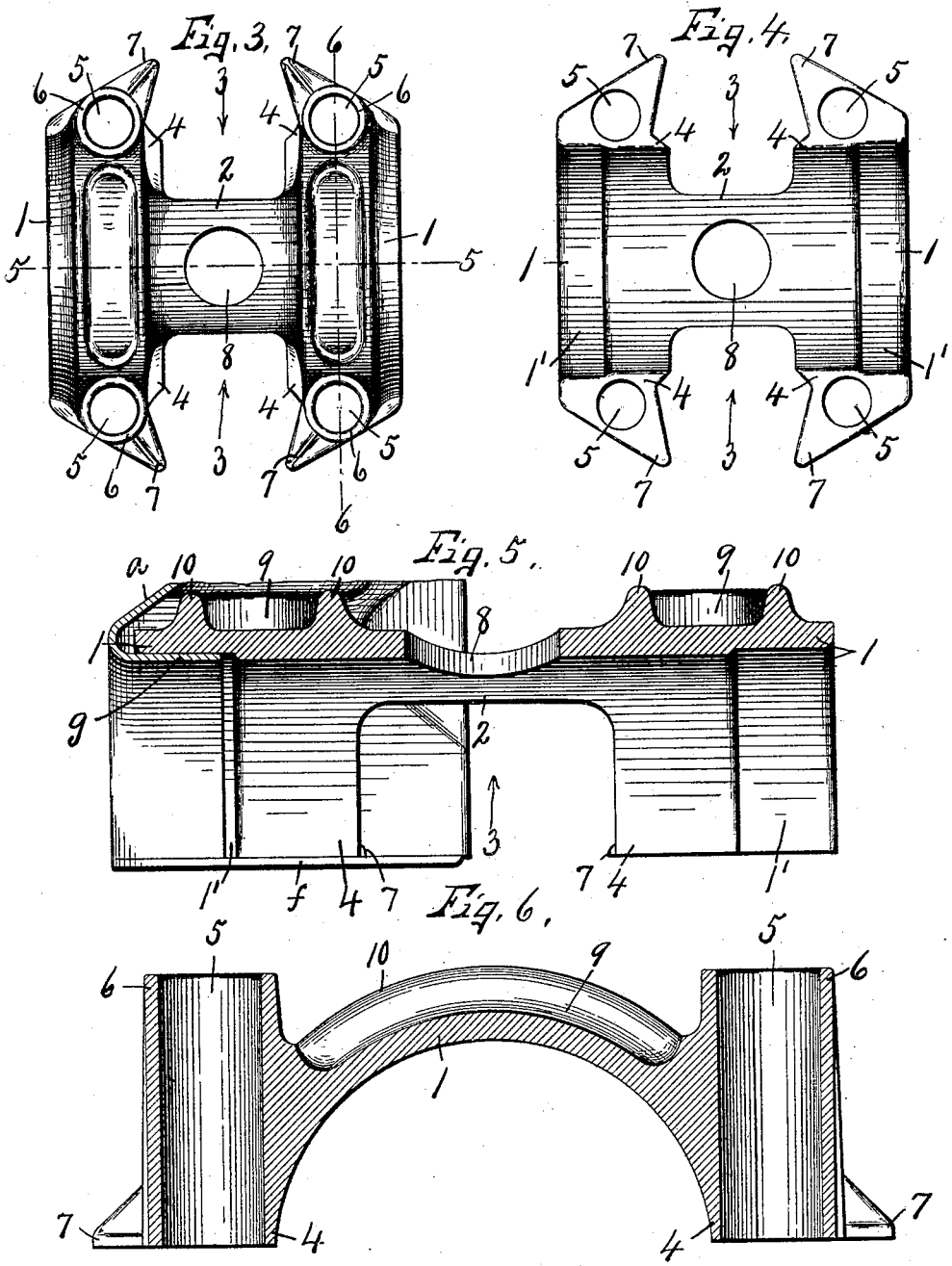

UNITED STATES PATENT OFFICE.

EDGAR T. SHEPARD, OF ONEIDA, NEW YORK.

YOKE FOR SPLIT SHEET-METAL PULLEYS.

No. 823,483. Specification of Letters Patent. Patented June 12, 1906.

Application filed June 16, 1905. Serial No. 265,604.

*To all whom it may concern:*

Be it known that I, EDGAR T. SHEPARD, of Oneida, in the county of Madison, in the State of New York, have invented new and useful Improvements in Yokes for Split Sheet-Metal Pulleys, of which the following, taken in connection with the accompanying drawings, is a full, clear, and exact description.

This invention relates to improvements in split pulleys, and refers more particularly to a reinforcing yoke or sleeve section for one of the half-sections of a split sheet-metal pulley or hub. These sheet-metal pulleys or hubs are usually divided axially and circumferentially, so that each half of the sheet-metal hub is divided at right angles to its axis into two similar sections, which are preferably conical and are secured together base to base by suitable fastening means, as rivets or bolts.

The primary object of my invention is to provide a rigid yoke, of malleable iron or similar metal, which is fitted within the opposite halves of the sheet-metal hub-section so as to rigidly tie said halves of the sheet-metal hub-sections together, and thereby reinforce it against tensile and compression strains to which said hub might be subjected.

A further object is to make the yoke as light as practicable and at the same time increasing its efficiency in gripping an inclosed bushing or shaft upon which the pulley or hub may be mounted.

In the use of split pulleys it is of course necessary to provide clamping means, as bolts, for securing the pulley or its hub to the shaft; and a further object of my invention is to locate these bolts and the bolt-holes in the hub and yoke sections in such manner as to cause the meeting corners and ends of the yoke-sections to grip firmly upon an inclosed sleeve or shaft.

Other objects and uses will appear in the following description.

In the drawings, Figures 1 and 2 are sectional veiws of a sheet-metal-pulley hub-section, taken, respectively, on lines 1 1, Fig. 2, and 2 2, Fig. 1, showing my improved yoke in operative position within the half-section of the hub. Figs. 3 and 4 are respectively top plan and inverted plan views of the detached yoke-section. Figs. 5 and 6 are sectional views taken, respectively, on lines 5 5 and 6 6, Fig. 3.

In Figs. 1 and 2 I have shown two opposed semiconical sheet-metal hub-sections $a$, which are arranged base to base, as best seen in Fig. 2, for forming one-half of a split pulley-hub, each of the sheet-metal sections $a$ being stamped from a single piece of sheet metal, the main body of which is semiconical and provided with opposite raised bosses $b$ at opposite sides of the axis of the hub for forming substantially flat horizontal ledges, each having a bolt-opening $c$. The base of each sheet-metal section is formed with an outwardly-projecting semi-annular flange $d$, having suitable bolt-openings $e$ for receiving bolts, (not shown,) but by which the two semiconical sections may be clamped together.) The axial meeting faces of each of the sections $a$ and also the apex ends of the same are turned inwardly-forming flanges $f$ and $g$, the flanges $f$ being folded under the meeting edge of the yoke, presently described, as best seen in Figs. 1 and 2, and the inturned flange $g$ being folded within one end of said yoke.

I have thus briefly described the two sheet-metal sections which form one-half of the hub of the wheel or pulley for the purpose of better illustrating the application and utility of my improved yoke, it being understood that each half of the pulley or wheel-hub is provided with one of these yokes, whereby each diametrically opposite half-section of the hub may be manufactured complete ready to be applied to the shaft or to a sleeve or bushing upon the shaft.

As seen in the drawings, each yoke is made of cast metal, preferably of malleable iron, and comprises opposed semi-annular heads or ends 1 and a central neck or web 2, which is of smaller diameter, thereby leaving open spaces 3 between the ends or heads 1 and at opposite sides of the neck 2.

It will be observed that the circumference or width of the neck 2 is considerably less than that of the ends or heads 1 and that this neck is comparatively thin, thereby permitting a slight spring action of the heads or ends 1 radially to insure the positive engagement or grip of said ends upon the shaft when the clamping-bolts, as $g'$, (shown by dotted lines in Fig. 2,) are tightened. By cutting away the intermediate portions of the yoke $a$ at opposite sides of the neck 2 it leaves said section with radially-projecting gripping-jaws 4, so that the meeting ends of the head 1, constituting the gripping-jaws 4, have an additional slight spring action to insure the positive gripping engagement of the corners of the yoke with an inclosed bushing or with the shaft upon which the yoke may be mounted.

As previously described, each of the semiconical hub-sections $a$ is provided with a pair of bolt-openings, each receiving one of the bolts $g'$, and the yoke is also provided with opposite pairs of openings 5, which are located in such relative position as to register with their respective openings $c$ in the hub-sections $a$ when the latter are assembled upon the yoke.

I have also previously stated that the sheet-metal hub-sections $a$ are provided with the raised bosses $b$, which are pressed outwardly, thereby forming angular sockets in the inner face of the hub-sections, and the yoke is provided with a corresponding number of raised bosses 6, which fit in the sockets and rest against the horizontal ledges of the raised portions $b$, said bosses 6 having the openings 5 therein and through which the clamping-bolts $g'$ are passed when clamping the opposite halves of the pulley together upon the shaft. The portions of the yoke in which the bolt-openings 5 are formed have a depth substantially equal to the distance between the ledge of the raised portion $b$ and inturned flange $f$, and these portions of the yoke are fitted between and held by said ledge and flange, so as to prevent radial movement of the sheet-metal hub-sections and yoke relative to each other.

It is now clear that the yoke is provided with four bolt-openings, one at each corner and passing through each of the jaws 4, there being two of these openings at each side or end of the comparatively narrow neck 2, so that when the sheet-metal sections $a$ are assembled upon the opposite ends of the yoke and the opposite half-sections of the wheel-hub are drawn together upon the shaft by the bolts $g'$ the sheet-metal parts of each half of the wheel-hub are firmly tied together and braced against endwise compression, and at the same time the end heads 1 and jaws 4 have a slight yielding action, so as to bring the ends of the yoke and meeting edges of the jaws 4 into close engagement with a shaft or into firm gripping engagement with a sleeve or bushing which may be inclosed by the hub of the wheel, thereby affording a more efficient gripping power and distributing the strain upon the yokes equally at the four corners as well as at the ends by reason of the fact that the comparatively thin narrow neck 2 and the space 3 between the jaws permits a slight resiliency at the ends and corners of the yoke. The opposite ends of each yoke have inner semi-annular grooves $l'$, which are of substantially the same depth as and receive the inturned semi-annular flanges $g$ of the sheet-metal hub-sections $a$, so that the inner faces of these flanges lie in substantially the same plane as that of the central portion of the yoke.

As shown in Figs. 1 and 2, the inturned flanges $f$, which fit snugly against the meeting face of the yoke, are provided with bolt-openings $h$ in alinement with the openings 5 and $c$, so that when the bolts are assembled for uniting the half-sections of the hub each of the sheet-metal sections $a$ is locked firmly in place both at the inner and outer ends of the bosses 6.

As previously stated, each of the sheet-metal sections $a$ is semiconical in form, and therefore their meeting edges having the flanges $f$ taper outwardly from the transverse center of the hub, and in order to further reinforce these portions of the hub I provide the yoke with opposite pairs of inwardly-converging spurs or projections 7, forming braces which engage and reinforce the flanges $f$.

As a further means for lightening the weight of the yoke the central portion or neck 2 is formed with an opening 8, and the heads 1 are provided with recesses 9 in their outer faces and with reinforcing-ribs 10, whereby the heads are lightened without sacrificing the strength of the material.

In assembling my invention the opposite sheet-metal sections $a$ are placed upon the opposite ends of the yoke with their enlarged ends or bases facing each other and the apertures $c$ and $h$ in alinement with their respective apertures or bolt-openings 5 in the yoke, after which the meeting faces or ends of the sections $a$ may be riveted or otherwise secured together, thereby completing one half of the hub, and after similarly assembling the parts of another half of the hub they are applied to opposite faces of the shaft or sleeve thereon, and the bolts $g'$ are then placed in operative position and drawn up tightly, thereby drawing the four corners of the yoke-sections into engagement with the sleeve or shaft. (Not shown.)

What I claim is—

1. A yoke for split sheet-metal wheel-hubs, said yoke having portions of its opposite sides between its ends cut away for forming opposed pairs of gripping-jaws, one pair at each side of the yoke whereby a slight yielding action of the jaws is permitted, each jaw being provided with a bolt-opening.

2. The combination with two opposed semiconical sheet-metal hub-sections, arranged base to base, of a yoke comprising semi-annular ends or heads and a connecting-neck which is narrower than the heads forming a jaw at each corner of the yoke, each jaw being provided with a bolt-opening and each of the heads being fitted within one of the hub-sections, said hub-sections having bolt-openings in registration with the openings in the jaws.

3. The combination with a half of a sheet-metal hub divided at right angles to the axis of the hub substantially midway between its ends forming opposed similar sections, each having a pair of bolt-openings at opposite sides of said axis, of a yoke comprising semi-annular ends or heads and a connecting-neck which is narrower than the heads forming a jaw at each corner of the yoke, each jaw being provided with a bolt-opening in alinement with one of the openings in the hub-section, and bolts passed through said openings for locking the hub-sections to the yoke.

In witness whereof I have hereunto set my hand this 12th day of June, 1905.

EDGAR T. SHEPARD.

Witnesses:
 HARRY W. FISHER,
 O. W. STURDEVANT.